United States Patent
Baughman et al.

(10) Patent No.: US 10,938,942 B2
(45) Date of Patent: Mar. 2, 2021

(54) DYNAMICALLY MODIFIED DELIVERY OF ELEMENTS IN A SPORTS RELATED PRESENTATION

(71) Applicant: International Business Machines Corporation, Armonk, NY (US)

(72) Inventors: Aaron K. Baughman, Cary, NC (US); Brian M. O'Connell, Cary, NC (US); David Alexander Provan, Acworth, GA (US); Stephen C. Hammer, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 16/366,057

(22) Filed: Mar. 27, 2019

(65) Prior Publication Data

US 2020/0314199 A1    Oct. 1, 2020

(51) Int. Cl.
  *H04L 29/08*   (2006.01)
  *G06N 7/00*    (2006.01)
  *G06N 20/00*   (2019.01)

(52) U.S. Cl.
  CPC ......... *H04L 67/2852* (2013.01); *G06N 7/005* (2013.01); *G06N 20/00* (2019.01); *H04L 67/1097* (2013.01)

(58) Field of Classification Search
  CPC . H04L 67/1097; H04L 67/2852; G06N 7/005; G06N 20/00
  USPC ........................................................ 709/223
  See application file for complete search history.

(56) References Cited

U.S. PATENT DOCUMENTS

| | | | |
|---|---|---|---|
| 8,260,921 B2 | 9/2012 | Uyama | |
| 2007/0156852 A1 | 7/2007 | Sundarrajan | |
| 2008/0300700 A1 | 12/2008 | Hammer | |
| 2012/0254456 A1* | 10/2012 | Visharam | H04N 21/2343 709/231 |
| 2013/0132516 A1* | 5/2013 | Robert | G06F 3/0481 709/217 |
| 2013/0238795 A1 | 9/2013 | Geffin | |
| 2014/0156863 A1* | 6/2014 | Gao | H04L 65/4084 709/231 |
| 2014/0281012 A1* | 9/2014 | Troxler | H04L 65/604 709/231 |
| 2015/0287057 A1 | 10/2015 | Baughman | |
| 2015/0371244 A1 | 12/2015 | Neuse | |
| 2016/0148223 A1* | 5/2016 | Saini | G06Q 10/067 705/7.31 |
| 2017/0201779 A1* | 7/2017 | Publicover | G06Q 30/0251 |
| 2017/0228061 A1* | 8/2017 | Qiao | G06F 3/0418 |
| 2018/0234738 A1* | 8/2018 | Sarkar | H04N 21/4223 |
| 2019/0370825 A1* | 12/2019 | Brueck | G06Q 30/0264 |

OTHER PUBLICATIONS

Syken, Noah, "Watson Serves Up Cognitive Highlights at the US Open" 9 pages, Aug. 29, 2017, AI/Watson, <https://www.ibm.com/blogs/client-voices/watson-serves-cognitive-highlights-us-open/>.

* cited by examiner

Primary Examiner — Frantz B Jean
(74) Attorney, Agent, or Firm — David B. Woycechowsky (57) ABSTRACT

Determining and/or adjusting cache expire times (sometimes herein referred to as "cache expires") based, at least in part to how much excitement a live event, such as a live sporting event, is generating in its audience. After the excitement from the live event has dissipated, the cache expires can be reset to the values that they would otherwise have during normal operations.

20 Claims, 7 Drawing Sheets

DYNAMICALLY MODIFIED DELIVERY OF ELEMENTS IN A SPORTS RELATED PRESENTATION

BACKGROUND

The present invention relates generally to the field of distribution of computer data relating to live events over communication networks, and more particularly to distribution of computer data relating to sporting events.

A web cache (or HTTP (hypertext transfer protocol) cache) is an information technology for the temporary storage (caching) of web documents, such as HTML (hypertext markup language) pages and images, to reduce server lag. A web cache system stores copies of documents passing through it. Subsequent requests may be satisfied from the cache if certain conditions are met. A web cache system can refer either to an appliance, or to a computer program.

A content delivery network or content distribution network (CDN) is a geographically distributed network of proxy servers and their data centers. CDNs serve a large portion of content that is delivered through the internet, such as web objects (text, graphics and scripts), downloadable objects (media files, software, documents), applications (e-commerce, portals), live streaming media, on-demand streaming media, and social networks.

As of 3 Mar. 2019, the Wikipedia entry for "Granger causality" stated as follows: "The Granger causality test is a statistical hypothesis test for determining whether one time series is useful in forecasting another, first proposed in 1969. Ordinarily, regressions reflect "mere" correlations, but Clive Granger argued that causality in economics could be tested for by measuring the ability to predict the future values of a time series using prior values of another time series. Since the question of "true causality" is deeply philosophical, and because of the post hoc ergo propter hoc fallacy of assuming that one thing preceding another can be used as a proof of causation, econometricians assert that the Granger test finds only 'predictive causality.' A time series X is said to Granger-cause Y if it can be shown, usually through a series of t-tests and F-tests on lagged values of X (and with lagged values of Y also included), that those X values provide statistically significant information about future values of Y. Granger also stressed that some studies using "Granger causality" testing in areas outside economics reached 'ridiculous conclusions.' . . . [Granger causality] remains a popular method for causality analysis in time series due to its computational simplicity. The original definition of Granger causality does not account for latent confounding effects and does not capture instantaneous and non-linear causal relationships, though several extensions have been proposed to address these issues."

SUMMARY

According to an aspect of the present invention, there is a method, computer program product and/or system that performs the following operations (not necessarily in the following order): (i) receiving an observer data set including information indicative of reactions of observers of a live event to the live event; (ii) determining, by machine logic, a first excitement value based, at least in part, upon the observer data set; and (iii) determining a set of cache expiration time(s), for cached data related to the live event based, at least in part, upon the first excitement value.

According to a further aspect of the present invention, there is a method, computer program product and/or system that performs the following operations (not necessarily in the following order): (i) receiving an observer data set including information indicative of reactions of observers of a live event to the live event; (ii) determining, by machine logic, time series of excitement values such that the excitement values are a function of time based, at least in part, upon the observer data set; (iii) determining, for the function of excitement values over time, a first time derivative value of the excitement values; and (iv) determining a set of cache expiration time(s), for cached data related to the live event based, at least in part, upon the first time derivative value of the excitement values.

According to a further aspect of the present invention, there is a method, computer program product and/or system that performs the following operations (not necessarily in the following order): (i) receiving an observer data set including information indicative of reactions of observers of a live event to the live event; (ii) determining, by machine logic, time series of excitement values such that the excitement values are a function of time based, at least in part, upon the observer data set; (iii) determining, for the function of excitement values over time, a second time derivative value of the excitement values; and (iv) determining a set of cache expiration time(s), for cached data related to the live event based, at least in part, upon the second time derivative value of the excitement values.

DETAILED DESCRIPTION

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
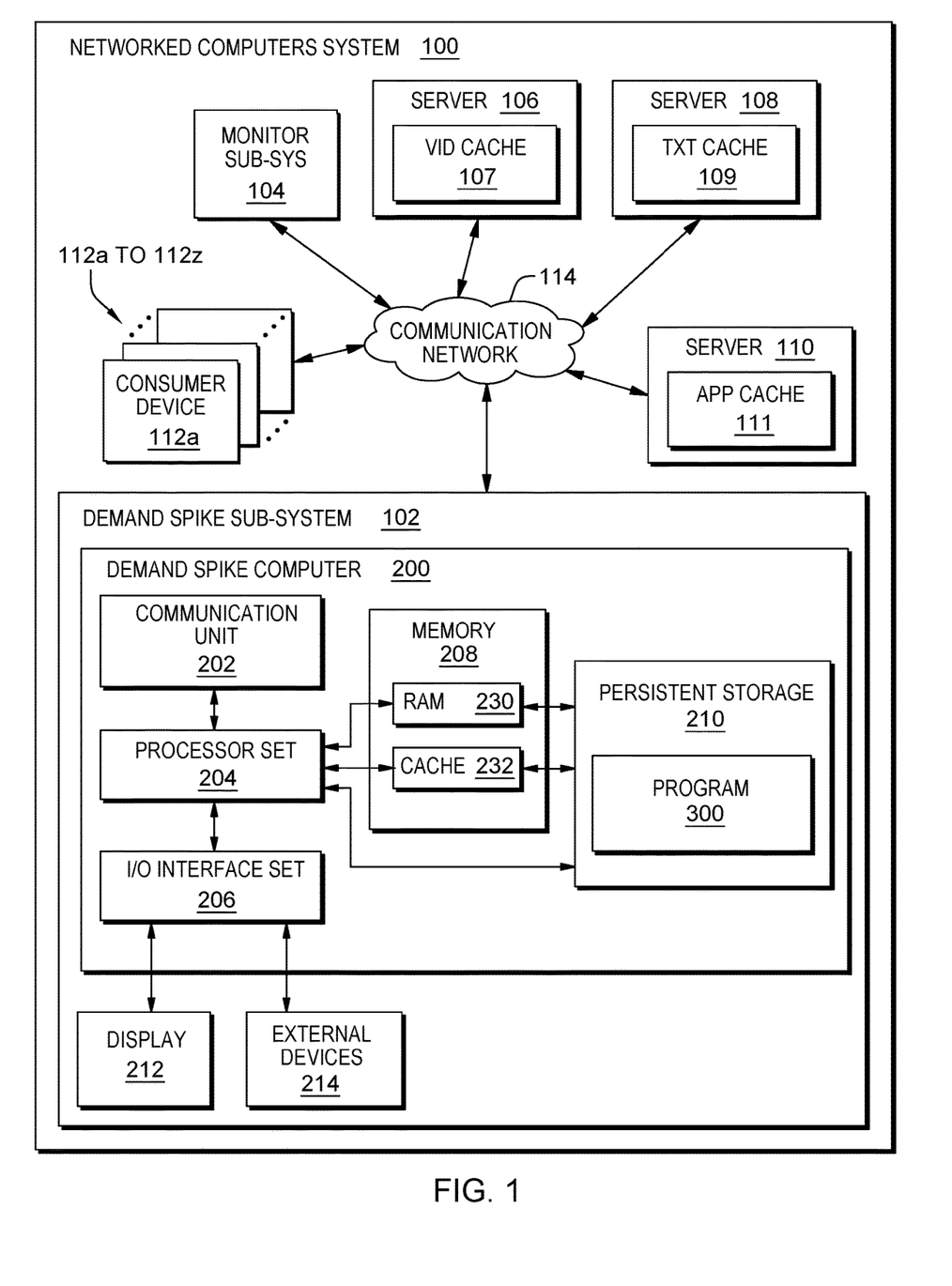
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: demand spike sub-system 102; monitor sub-system 104; server sub-system 106 (including video cache 107); server sub-system 108 (including text cache 109); server sub-system 110 (including app cache 111); consumer devices 112a to 112z; and communication network 114. Demand spike sub-system includes: demand spike computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
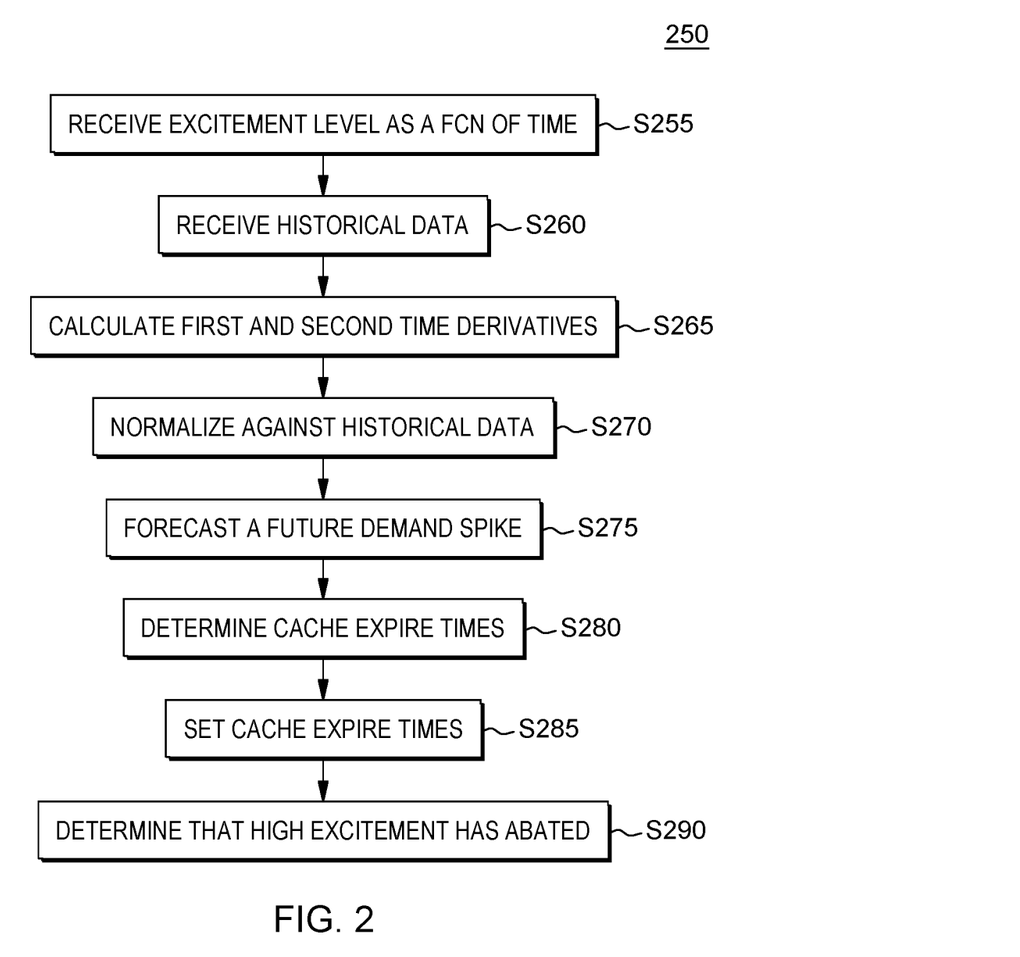
FIG. 2 is a flowchart showing a first embodiment method performed, at least in part, by the first embodiment system.
Figure 3:
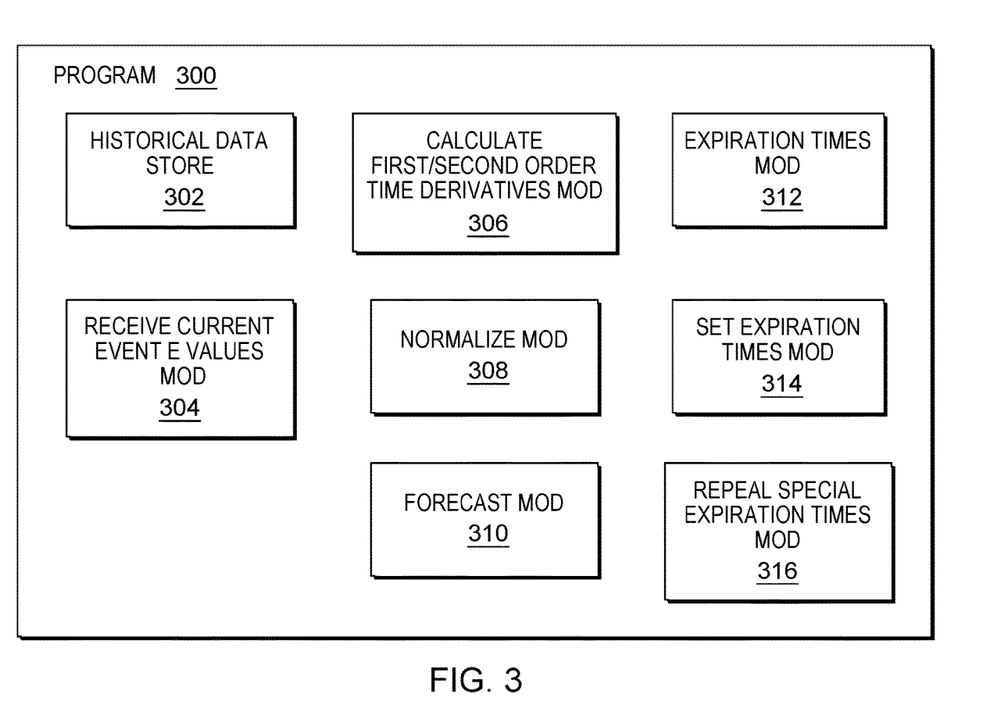
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receive current event excitement values (E values) module ("mod") 304 receives a series of excitement values, relating to a live event over time. This is also called a times series of e values. In this example, the live event is a chess game that is part of an international chess tournament. The chess tournament is one of the biggest chess events of the entire year. Chess fans around the globe are: (i) reading real time text based accounts of the match found in chess related media sites and the blogs of chess fans; and (ii) watching real time video of the chess match (between famous chess players Abel and Baker) that streams through the app StreamingChessVid.

In this example, the time series of e values comes from a monitoring team of human monitors who use monitor subsystem 104 to send their real time determinations of current e values to mod 304 through communication network 114. Alternatively or additionally, and as will be further discussed in the following sub-section of this Detailed Description section, these e values could be determined by machine learning, artificial intelligence, cognitive computing and the like.

Figure 4:
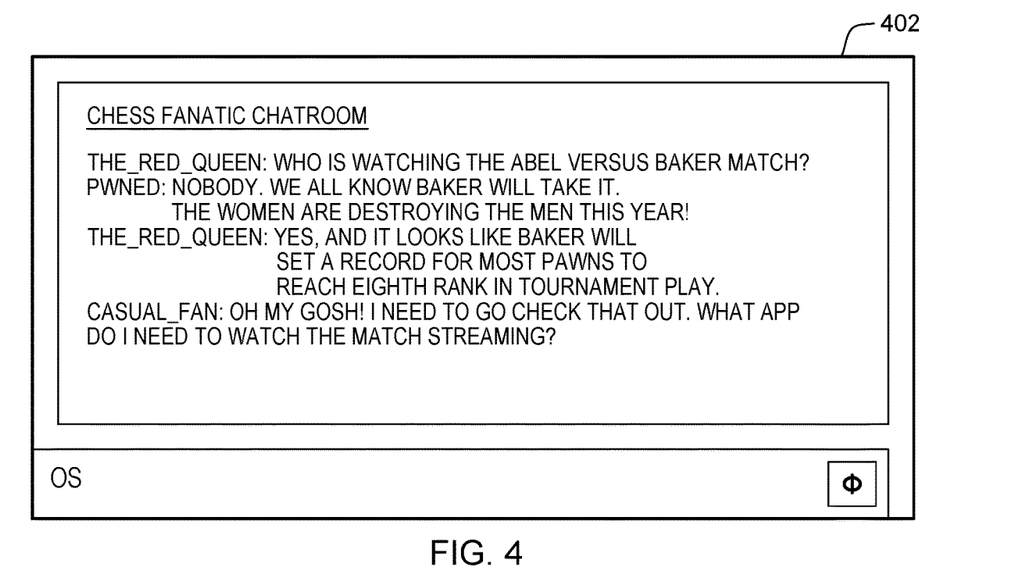
FIG. 4 is a screenshot view helpful in understanding operation of the first embodiment system.

In this example, the human monitors base their e value determinations on: (i) the knowledge of the human monitors about the context of the chess match and the way the chess match is transpiring; and (ii) monitoring the posts at the Chess Fanatic Chatroom, which has long been an insightful source of real time commentary on the most important chess matches of modern times. Screenshot 402 of the Chess Fanatic Chatroom is shown in FIG. 4. As can be easily seen with the commentary there, the e values for the Abel versus Baker match are rising over time, in this example due to the possibility of a long standing and significant chess tournament record being broken during the Abel versus Baker chess match. As will be discussed in the following sub-section of this Detailed Description section, other sources of information about the live event may be used as input for determining e values.

Processing proceeds to operation S260, where historical data store 302 receives historical information about e values over time for previous chess matches that share at least some degree of similarity with the Abel versus Baker chess match.

Processing proceeds to operation S265, where calculate first/second order time derivatives mod 306 calculates first and second derivatives based on the series of e values. The first order time derivative reflects how much excitement is increasing with time. The second order time derivative reflects how much the excitement level is accelerating (that is, is the increase in excitement itself increasing, or, alternatively, in the increase in excitement slowing down). In this example, these first and second time derivatives are not "instantaneous," but rather are based upon how the excitement has been trending over some time period(s). More specifically, trends over longer and shorter time periods within the Abel versus Baker chess match are all taken into account in determining the first and second order time derivative values in this example.

Processing proceeds to operation S270, where normalize mod 308 normalizes the most recent e value received, the first order time derivative and the second order time derivative. This is done because the fact that Abel and Baker are having a chess match has already been accounted for in setting expiration times for data related to the match in various caches (for example, caches 107, 109, 111 (see FIG. 1)). What demand spike sub-system is doing is more about predicting a demand spike for data related to the chess match in real time, where the spike is over and above what would be expected based merely on the information that Abel and Baker are going to have a chess match. Normalization helps determine whether there is going to be a spike over and above the baseline expected interest in the match.

Processing proceeds to operation S275, where forecast mod 310 forecasts a demand spike based on: (i) the most recent e value (as normalized); (ii) the first order time derivative of the e values as a function of time (as normalized); and (iii) the second order time derivative of the e values as a function of time (as normalized). Alternatively, some subset of these values may be used in predicting a demand spike. The next sub-section of this Detailed Description section will go into much greater detail about how demand spikes are predicted based on trends in e values in some embodiments of the present invention.

Processing proceeds to operation S280, where, responsive to the predicted demand spike at operation S275, cache expiration times are determined by expiration times mod 312. These expiration times generally extend further in the future because the more data that is held in more caches for a longer period of time means that the demand spike can be more easily accommodated without causing consumer devices 112a to z (see FIG. 1) to be denied their data, or to have to wait for data regarding the chess match. This can be especially important for live events because people who are interested in a live event tend to want to know about important outcomes with minimal latency (and, of course, this is especially true of chess fans).

Processing proceeds to operation S285, where set expiration times mod 314 sets longer expiration times for video data cache 107, text data cache 109 and app cache 111 (see FIG. 1). This means that it will be quicker and more reliable for consumer devices 112a to 112z to get data relating to the Abel versus Baker match when the predicted demand spike occurs (in this case, as a record for pawn promotion in tournament play is broken).

Processing proceeds to operation S290, where repeal special expiration times mod 316 determines that the predicted demand spikes are abating (or perhaps that they never materialized) and repeals the extended cache extension times set at previous operations S280 and S285. In other words, the cache expirations are back in a mode of normal operations, set as they would be without the demand spike prediction of the present invention.

III. Further Comments and/or Embodiments

Trending excitement can drive demand spikes to computer and communication infrastructure that serves up computer data, in various forms, to end users. By measuring the excitement from various sources using cognitive technologies, and normalizing these measurements against historical measurements of traffic volume for similar past events, computers can be used forecast future demand spikes as a match (that is, a sporting contest or game) becomes more and more exciting over time. Certain resources in an infrastructure are more susceptible to failure during these demand spikes.

Some embodiments of the present invention may include one, or more, of the following features, characteristics and/or advantages: (i) dynamically modified delivery of elements in a sporting digital experience; (ii) distribute, through a CDN, service spatially relative to end-users to provide high availability and high performance; (iii) measures the trending excitement at sporting events (including noise level, action recognition, and crowd cheering) to dynamically modify the delivery of specific elements in a sporting digital experience; (iv) prevents "flash crowds" from overwhelming an infrastructure in order to deliver satisfactory and/or optimal user experience; (v) predicts which objects may need changes in cache expire times in order to handle increasing crowd excitement; and/or (vi) uses measured, continued crowd and player excitement to determine future demand on specific elements in a digital platform and adjusts cache expires automatically to reduce demand on the cloud infrastructure.

Some embodiments of the present invention may include one, or more, of the following features, characteristics and/or advantages: (i) determine crowd and player excitement; (ii) determination of whether excitement (as measured by a number called an "excitement value" is increasing over time; (iii) if the trend in excitement value (for example, first time derivative of the excitement value, also sometimes herein referred to as the velocity of the excitement value) exceeds a predetermined threshold, the modify expire times of likely-to-be-popular web objects; and (iv) uses excitement value, first time derivative of excitement value or second time derivative of excitement value and/or third derivative of excitement value to determine cache expiration times.

Figure 5:
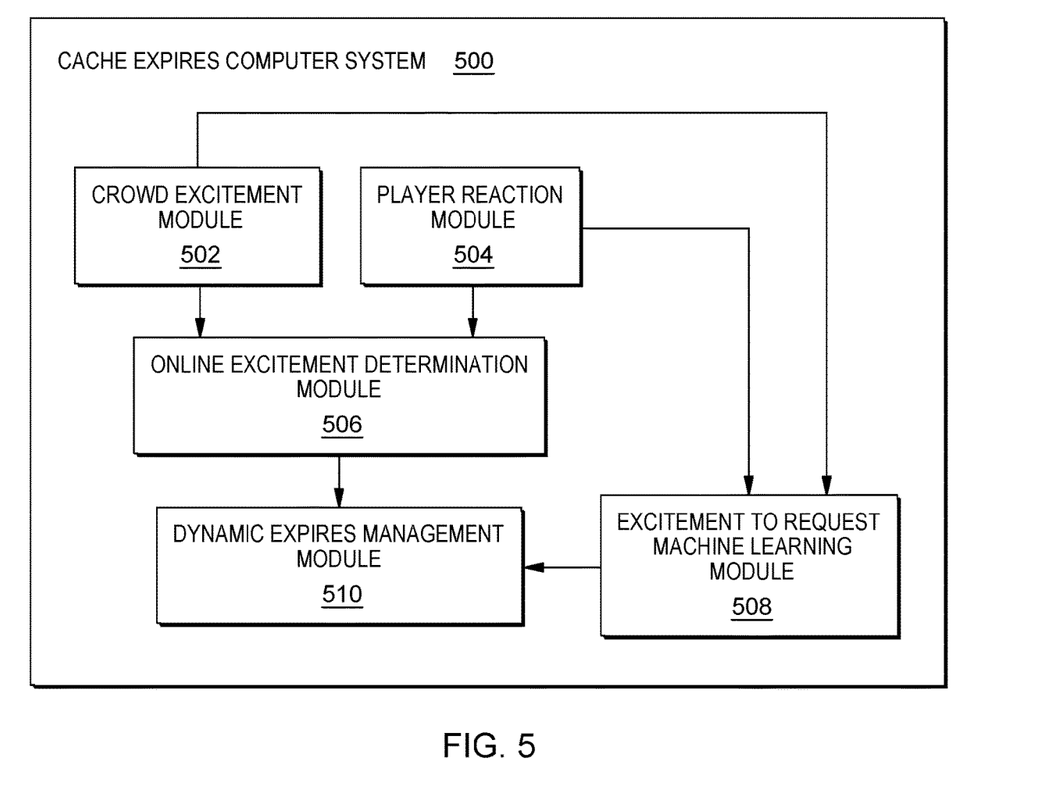
FIG. 5 is a block diagram view of a second embodiment of a system according to the present invention.

FIG. 5 shows a block diagram of various software modules ("mods") in cache expires computer system 500, including: crowd excitement module 502; player reaction mod 504; online excitement determination module 506; excitement to request machine learning mod 508; and dynamic expires management module 510. System 500 uses changes in the level of crowd excitement to forecast web object requests.

Crowd excitement mod 502 and player excitement mod 504 are related components. System 500 uses multiple polynomial regression to determine the magnitude of excitement change with both crowd and player excitement. In this embodiment, mods 502 and 504 forecast crowd and player components forward in time, separately but not independently, through granger time series forecasting. The slope of the best regression to the historical and forecasted data will determine if there is moment for each excitement type. This enables system 500 to determine that crowd and player excitement is building and to distinguish this situation from a one time "great shot" or "great play" situation.

Excitement to request machine learning mod 508 (also sometimes herein referred to as the excitement to object mapping component) will now be discussed. Each of the objects that are stored within a cache will have an associated vector. The vector will have features that describe the object such as primary colors in HSV and RGB space, object recognition results, deep learning convnet exports. The player reaction and crowd reaction will also have similar vectors. The proposed invention uses machine learning techniques to determine an operator to apply between both vectors. In this embodiment, mod 508 uses a custom equation that learns how to combine the vectors into a similarity score or probability. If the similarity score is above an experimentally determined threshold, the two objects are related. As such, the mod 508 can infer that the most related objects to the specific crowd and player reactions will be requested. In this embodiment, mod 508 uses extreme value testing to determine if cloud resources will see an extreme amount of traffic than has been seen before. In this embodiment, Gumble distribution helps to determine if a more extreme value of traffic volume will happen.

In some embodiments Gumble distribution is used to model the maximum and minimum amount of traffic volume. The probability density function of the Gumble distribution is determined by the following equation:

$$F(x) = \frac{1}{\beta} e^{-(z+e^{-z})}$$

The value is z in the equation above is determined by the following equation:

$$z = \frac{x-\mu}{\beta}$$

The parameters beta and mu are hyperparameters learned during supervised training.

The $\beta$ is the scale parameter. The scale parameter is learned from previous runs given the video evidence. The probability of the traffic number is the ground truth. A stochastic gradient is used to learn $\beta$. The $\mu$ value is the mode or the most frequent number of times a certain traffic number is seen given the distribution of the traffic numbers.

Another useful equation that uses an n-th degree polynomial regression has the following form:

$$y = \beta_0 + \beta_1 x_1 + \beta_2 x_1^2 + \ldots + \beta_n x_1^n + \ldots + \beta_0 + \beta_1 x_m + \beta_2 x_m^2 + \ldots + \beta_n x_m^n$$

The resulting y value is a traffic number from historical trends. The values become as follows:
$x_1$=commentator tone metric
$x_2$=overall metric
$x_3$=gesture metric
$x_4$=crowd metric
$x_5$=commentator text metric Within the Gumble distribution, the resulting y value is passed into F(x) to get a probability that the traffic volume will occur on the data element. The probability that a data element will receive the traffic estimate is used to determine the expires time on the data element. Another polynomial regression equation is as follows:

$$z = \beta_0 + \beta_1 x_1 + \beta_2 x_1^2 + \ldots + \beta_n x_1^n + \ldots + \beta_0 + \beta_1 x_m + \beta_2 x_m^2 + \ldots + \beta_n x_m^n$$

The foregoing equation takes into account the Gumble probability and y value to determine a new expires time z. Those of ordinary skill in the art will understand how the expires can be dynamically modified (for example, modified while a sporting event is taking place) to have time z, and also how to change the expires time back at the appropriate time.

Figure 6A:
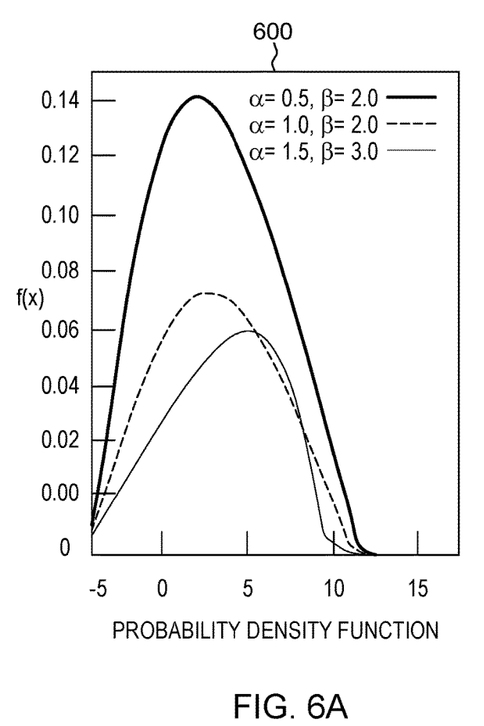
FIG. 6A is a graph helpful in understanding operation of the second embodiment system.
Figure 6B:
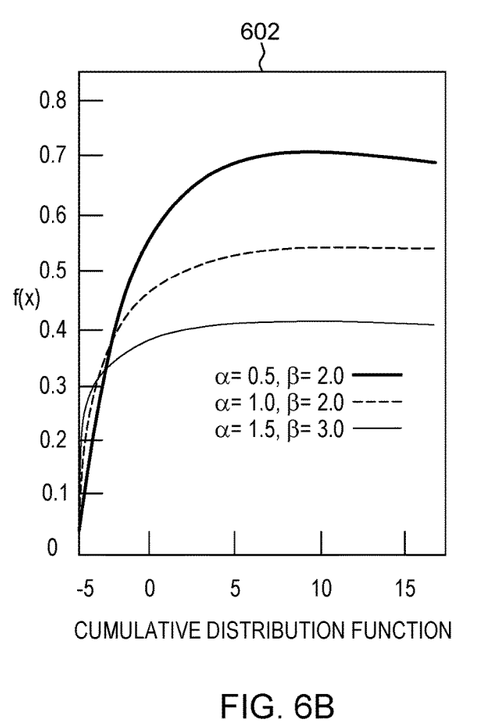
FIG. 6B is another graph helpful in understanding operation of the second embodiment system.
Figure 7:
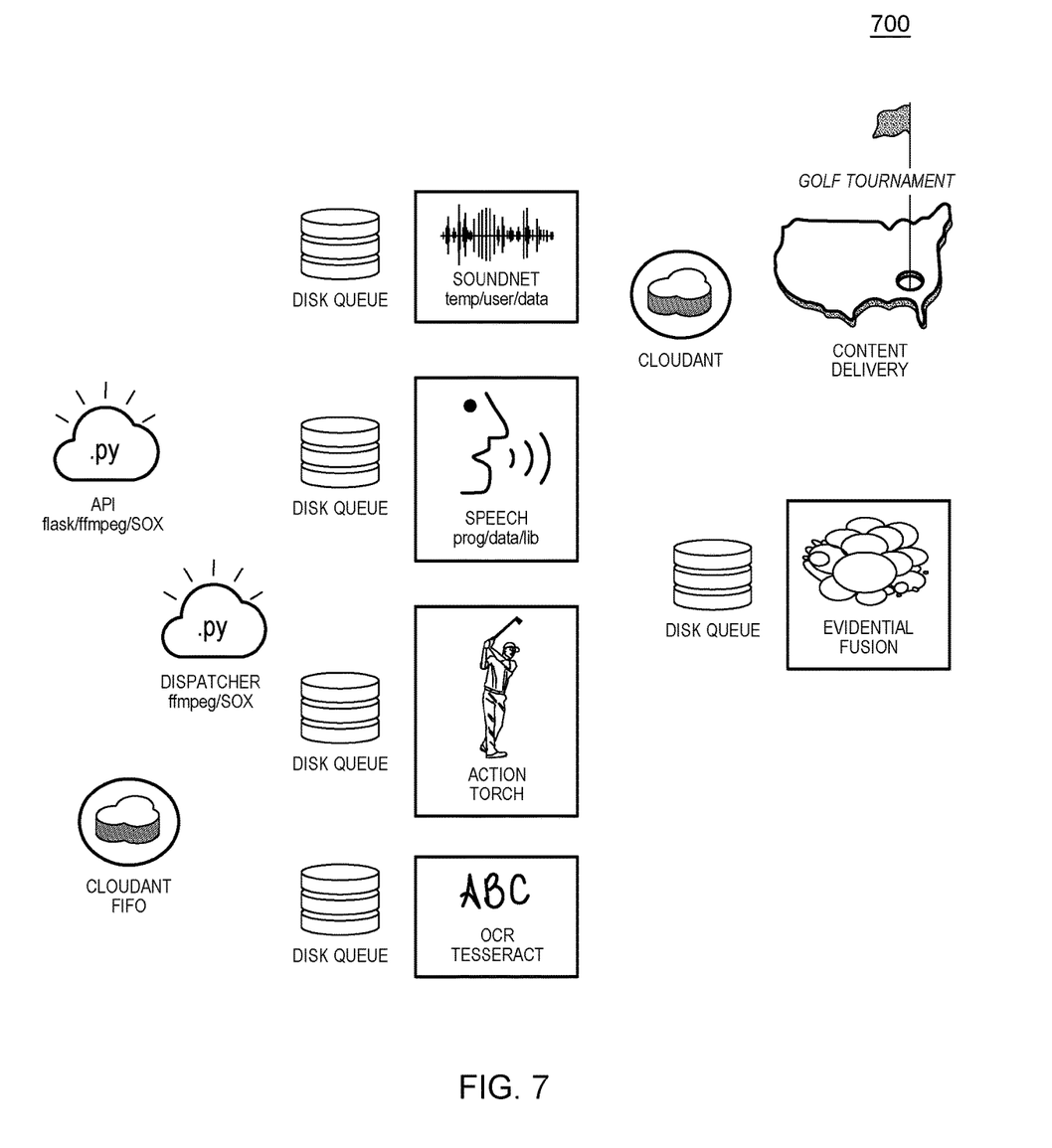
FIG. 7 is a block diagram view of a third embodiment of a system according to the present invention.
Figure 8:
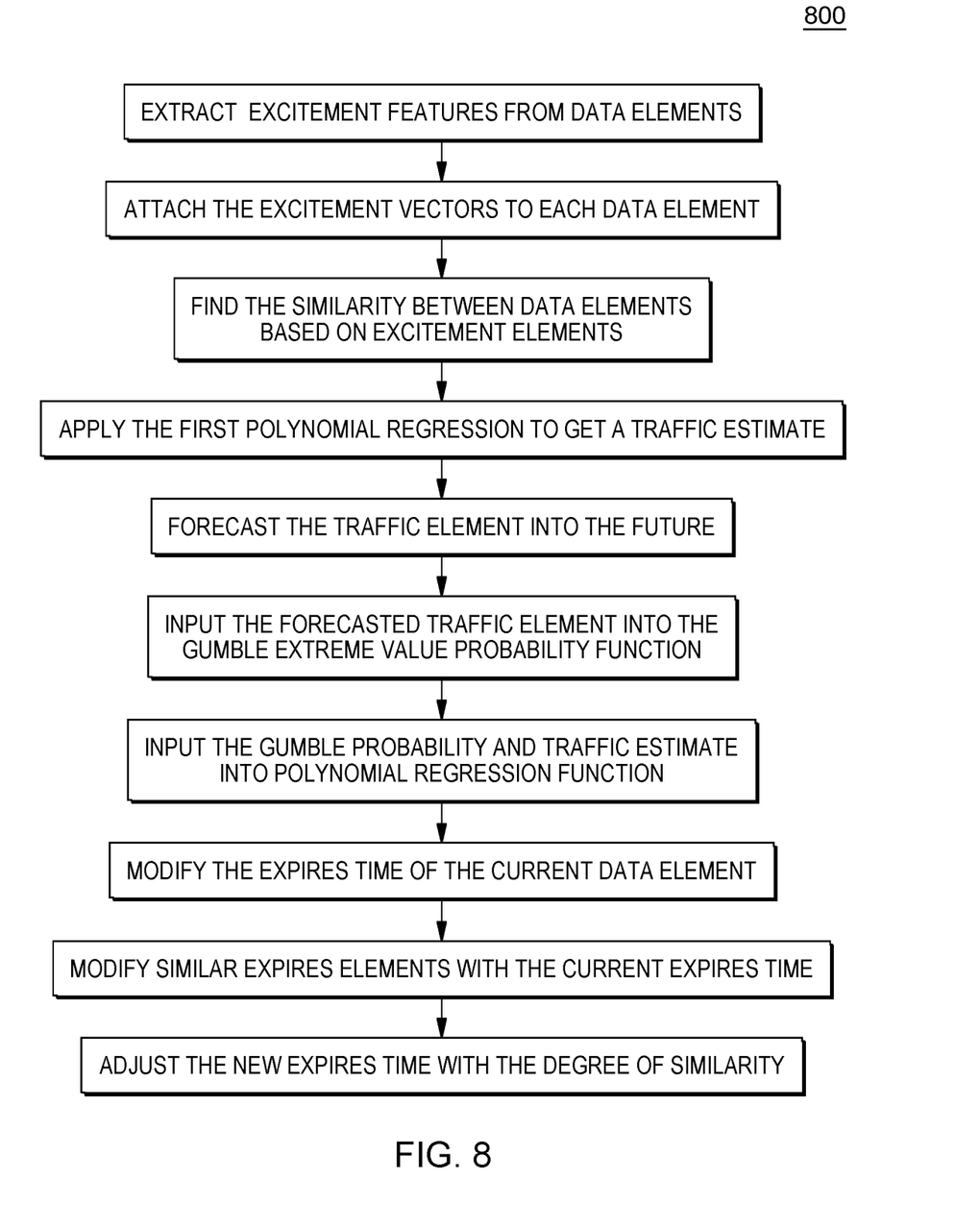
FIG. 8 is a flowchart showing a second embodiment method performed, at least in part, by the second embodiment system.

FIG. 6A shows graph 600 which includes a plot of three probability density functions based on different underlying values. FIG. 6B shows graph 602 which includes a plot of three cumulative distribution functions based on different underlying values. FIG. 7 shows block diagram 700 which illustrates an embodiment of the present invention. Flow chart 800 of FIG. 8 is a general flow diagram of a method according to one embodiment of the present invention.

Some embodiments of the present invention may include one, or more, of the following features, characteristics, advantages and/or operations: (i) use of measured continued crowd and player excitement to determine future demand on specific elements in a digital platform; (ii) adjusting cache expires automatically to reduce demand on the cloud infrastructure; (iii) determine crowd and player excitement; (iv) determination if excitement is increasing over time; (v) if excitement exceeds threshold, modify expires times of likely to be popular web objects; (vi) machine learning to match crowd excitement to web object requests; and/or (vii) predicting which objects may need expires changes to handle increasing crowd excitement.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving an observer data set including information indicative of reactions of observers of a live event to the live event, with the observers being located at the live event while the live even is happening;
determining, by machine logic, a first excitement value based, at least in part, upon the observer data set; and
determining a set of cache expiration time(s), for cached data related to the live event based, at least in part, upon the first excitement value.

2. The CIM of claim 1 wherein the determination of cache expire times includes Granger time series forecasting.

3. The CIM of claim 1 wherein the determination of cache expire times includes determination of a Gumble probability.

4. The CIM of claim 1 wherein the determination of cache expire times includes calculating at least one polynomial regression with terms including values from the observer data set.

5. The CIM of claim 1 wherein the observer data set includes at least the following types of observer data: commentator tone data, gesture data, crowd reaction data and commentator text data.

6. The CIM of claim 1 further comprising:
setting a set of cache(s) to respectively have the set of cache expiration time(s).

7. The CIM of claim 6 further comprising:
operating the set of cache(s) with cache expirations governed by the set of cache expiration time(s);
determining that excitement from the live event has abated; and
responsive to the determination that excitement from the live event has abated, re-setting the set of cache(s) to have expiration times as they would during normal operations.

8. The CIM of claim 1 wherein:
the determination of the set of cache expiration time(s) includes multiple polynomial regression to determine the magnitude of excitement change.

9. The CIM of claim 8 wherein the multiple polynomial regression determines the magnitude of excitement change with respect to both of the following: crowd excitement and player excitement.

10. The CIM of claim 8 wherein the multiple polynomial regression to determine the magnitude of excitement change effectively determines that crowd and player excitement is building and distinguishes from a one time great shot or great play situation.

11. The CIM of claim 1 wherein the live event is a sporting event.

12. The CIM of claim 1 wherein:
the set of cache(s) are included in s content delivery network that is a geographically distributed network of proxy servers and data centers; and
the cache(s) of the set of cache(s) store at least one of the following types of data: web objects, downloadable objects, applications, live streaming media, on-demand streaming media, and/or social networks.

13. A computer-implemented method (CIM) comprising:
receiving an observer data set including information indicative of reactions of observers of a live event to the live event, with the observers being located at the live event while the live even is happening;
determining, by machine logic, time series of excitement values such that the excitement values are a function of time based, at least in part, upon the observer data set;
determining, for the function of excitement values over time, a first time derivative value of the excitement values; and
determining a set of cache expiration time(s), for cached data related to the live event based, at least in part, upon the first time derivative value of the excitement values.

14. The CIM of claim 13 wherein the observer data set includes at least the following types of observer data: commentator tone data, gesture data, crowd reaction data and commentator text data.

15. The CIM of claim 13 further comprising:
setting a set of cache(s) to respectively have the set of cache expiration time(s).

16. The CIM of claim 15 further comprising:
operating the set of cache(s) with cache expirations governed by the set of cache expiration time(s);
determining that excitement from the live event has abated; and
responsive to the determination that excitement from the live event has abated, re-setting the set of cache(s) to have expiration times as they would during normal operations.

17. The CIM of claim 13 wherein the live event is a sporting event.

18. The CIM of claim 13 wherein:
the set of cache(s) are included in s content delivery network that is a geographically distributed network of proxy servers and data centers; and
the cache(s) of the set of cache(s) store at least one of the following types of data: web objects, downloadable objects, applications, live streaming media, on-demand streaming media, and/or social networks.

19. A computer-implemented method (CIM) comprising:
receiving an observer data set including information indicative of reactions of observers of a live event to the live event, with the observers being located at the live event while the live even is happening;
determining, by machine logic, time series of excitement values such that the excitement values are a function of time based, at least in part, upon the observer data set;
determining, for the function of excitement values over time, a second time derivative value of the excitement values; and
determining a set of cache expiration time(s), for cached data related to the live event based, at least in part, upon the second time derivative value of the excitement values.

20. The CIM of claim 19 wherein:
the set of cache(s) are included in s content delivery network that is a geographically distributed network of proxy servers and data centers; and
the cache(s) of the set of cache(s) store at least one of the following types of data: web objects, downloadable objects, applications, live streaming media, on-demand streaming media, and/or social networks.

\* \* \* \* \*